Dec. 5, 1961  K. W. KLINKSIEK  3,011,728
COIL WINDING MACHINE
Filed July 8, 1957  2 Sheets-Sheet 1
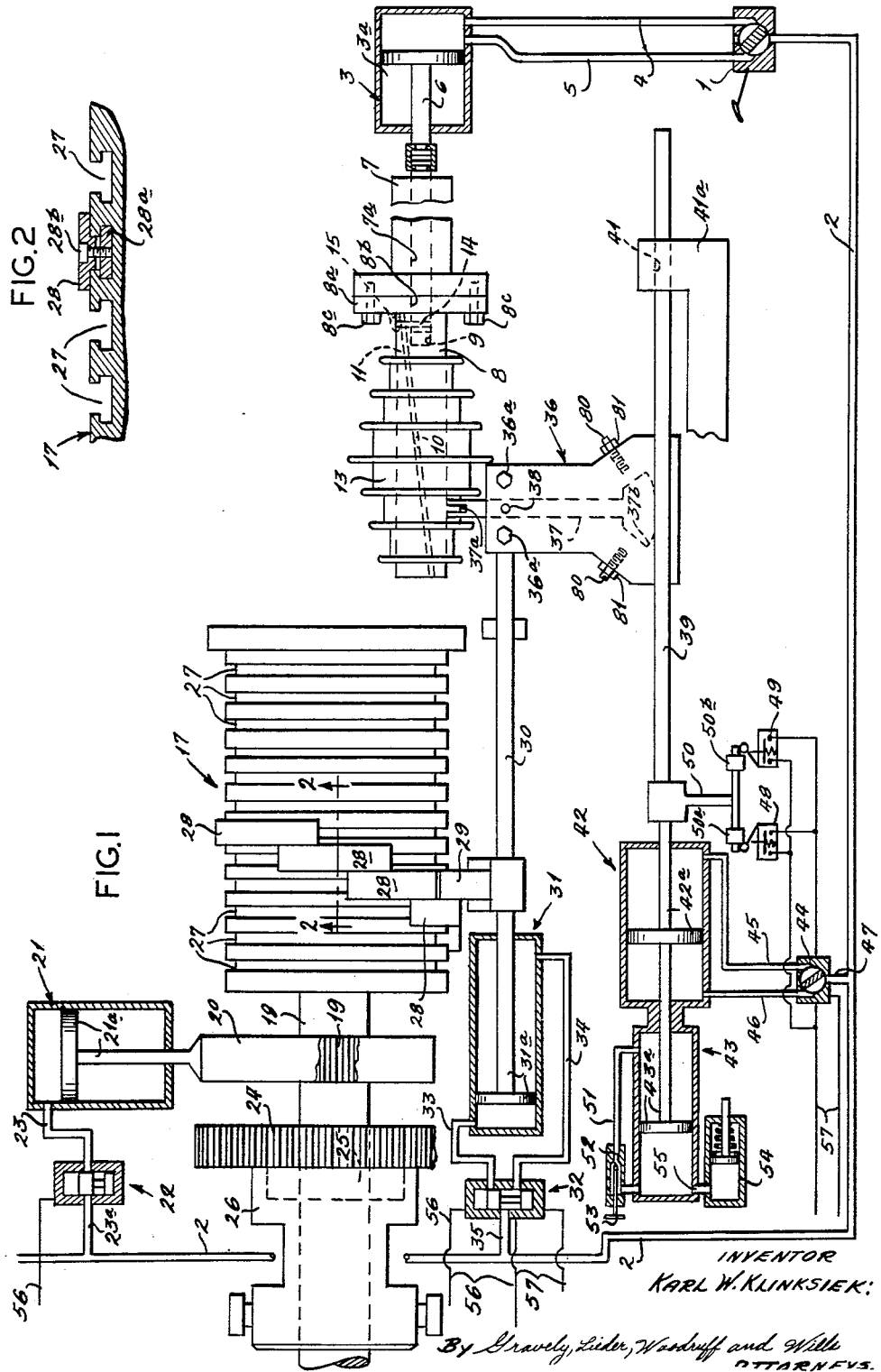
INVENTOR
KARL W. KLINKSIEK;
By Gravely, Lieder, Woodruff and Wille
ATTORNEYS.

Dec. 5, 1961  K. W. KLINKSIEK  3,011,728
COIL WINDING MACHINE
Filed July 8, 1957  2 Sheets-Sheet 2
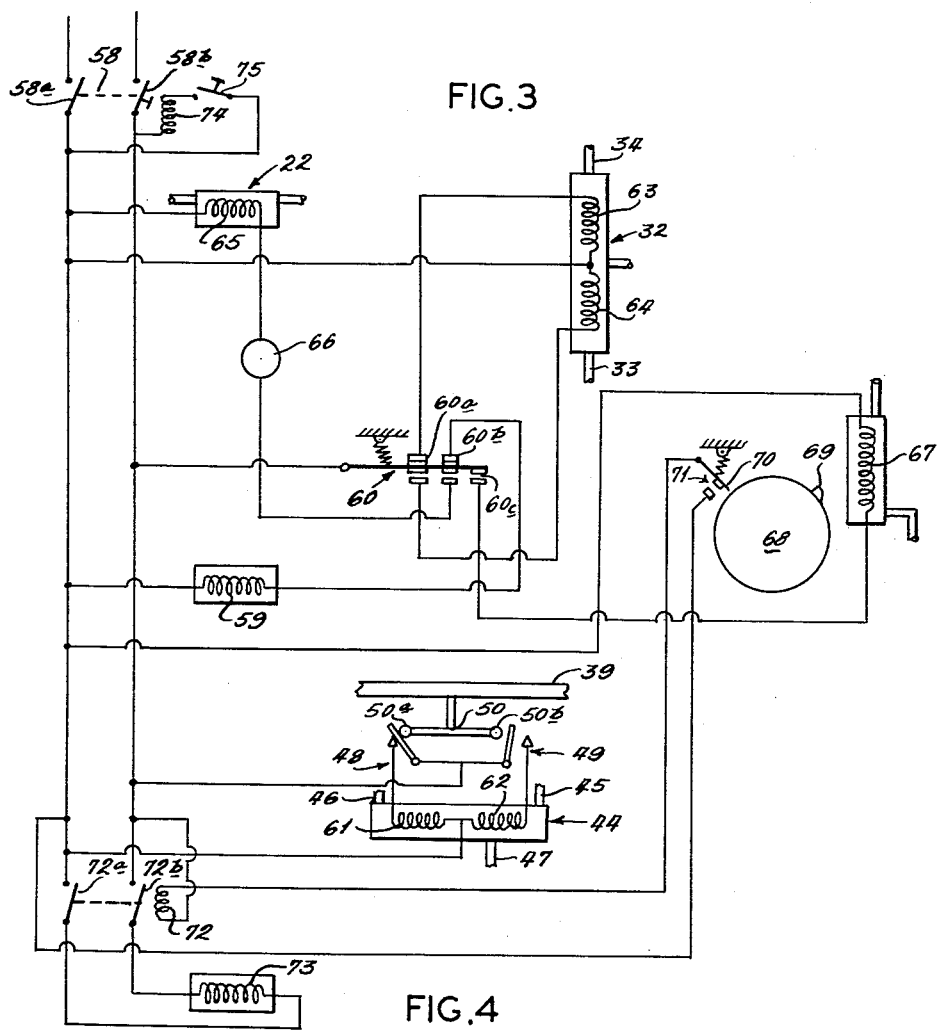
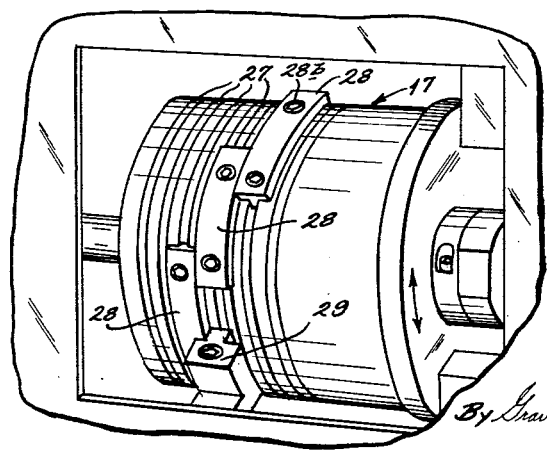
INVENTOR:
KARL W. KLINKSIEK
By Gravely, Lieder, Woodruff and Wills
ATTORNEYS.

United States Patent Office 3,011,728
Patented Dec. 5, 1961

3,011,728
COIL WINDING MACHINE
Karl W. Klinksiek, Richmond Heights, Mo., assignor to Wagner Electric Corporation, St. Louis, Mo., a corporation of Delaware
Filed July 8, 1957, Ser. No. 670,418
7 Claims. (Cl. 242—9)

The present invention relates generally to coil winding machines and more particularly to automatic coil winding machines capable of winding a plurality of coils in a continuous operation.

Many different kinds of coil winding machines have been devised and constructed in the past. These known machines, for the most part, have been constructed to wind particular kinds of coils and have been complicated to assemble, to adjust, and to operate. Furthermore, the known machines, being designed for particular operations, are limited in their range of adjustment and in the dimensions of the coils that can be wound.

The disadvantages and limitations of the known machines are overcome in the present coil winding machine which employs a minimum number of parts, is automatic, is simple to construct and operate, and is fully adjustable for varying the dimensions of the coils to be wound.

It is therefore a principal object of the present invention to provide an automatic coil winding machine that is inexpensive and relatively simple to construct and yet which provides maximum adjustment of the dimensions of every coil wound.

Another object of the present invention is to provide a coil winding machine that will automatically wind a plurality of coil forms with minimum attention by an operator.

Another object is to provide a traversing device for a coil winding machine that is capable of winding a plurality of coil forms having different dimensions in a continuous and automatic operation.

Another object is to provide a simple inexpensive traversing mechanism for a coil winding machine that is adjustable for winding a plurality of coils of different dimensions in a continuous operation.

Another object of the present invention is to provide a traversing mechanism for a coil winding machine that automatically shifts from a position registering with one coil form to a position registering with another coil form.

Still another object is to control the operation of a traversing mechanism in a coil winding machine by a fluid pressure system.

Briefly, the present invention comprises means for rotatably supporting a plurality of coil forms, all or part of which may have different dimensions, during the winding of threaded material thereon, traversing means positioned adjacent to the rotating coil forms for guiding the threaded material thereon, and fluid motor means including control means therefor for moving the traversing means so as to guide the threaded material onto one of the coil forms and for moving the traversing means from a position of registration associated with one of the coil forms to a position of registration with another coil form without interrupting the continuity of operation of the machine.

Other objects and advantages of this invention will become apparent after considering the following detailed specification in conjunction with the accompanying drawings.

In the drawings:

FIG. 1 is a schematic plan view showing the elements of a coil winding machine constructed according to the teachings of the present invention, FIG. 2 is a fragmentary cross-sectional view taken along the line 2—2 in FIG. 1.

FIG. 3 is a schematic wiring diagram of a typical electrical circuit for the present coil winding machine, and FIG. 4 is an enlarged fragmentary perspective view of the indexing mechanism for the coil winding machine of FIG. 1.

In the accompanying drawings, the number 1 (FIG. 1) refers to a manually operated valve connected on its inlet side to a source of compressed air or fluid (not shown) by a conduit 2 and on its outlet side to an air or fluid motor 3 by exhaust conduit 4 and pressure conduit 5. Only one of the conduits 4 or 5 is active at a time; the exhaust conduit 4 being active to relieve the pressure in the motor 3 and the conduit 5 to feed air or fluid thereto.

The motor 3 has a housing 3a with a chamber that slidably positions a piston and rod assembly 6, and the assembly 6 extends outwardly from the left end thereof and passes through a bore 7a in a driven member 7. From there the assembly 6 extends leftwardly through a bore 8b in a mandrel mounting plate 8a and into a bore 9 in a mandrel 8. The mounting plate 8a is formed integral with the mandrel 8 and is fastened to the driven member 7 by screws or bolts 8c. The driven member 7 including the mandrel 8 is rotated by suitable drive means (not shown).

The mandrel 8 is provided with a tapered axial groove 10 which slidably receives a cooperating wedge shaped member 11. When the wedge shaped member 11 is in a leftward position in the groove 10 (FIG. 1), the outer surface thereof is even with or recessed relative to the surface of the mandrel 8 and coil forms or spools 13 with a suitable bore can be moved into mounted position on the mandrel 8. With the coil forms 13 positioned on the mandrel 8, the wedge 11 is moved to a rightward position in which its outer surface engages the bore in the coil forms 13 and locks the coil forms in position thereon.

A pin 14 connects the left end of the assembly 6 to the right end of the wedge 11 and a radial bore 15 in the wedge 11 receives the pin 14 and allows the pin to move radially relative therefor for different positions of the assembly 6. It is anticipated, however, that the pin 14 could be connected to the assembly 6 and the wedge 11 or only to one and slidably engaged in the other.

During rotation of the mandrel 8 and coil forms 13, traversing mechanism which will be described hereinafter continuously guides wire or other threaded material onto the coil forms 13 moving from coil form to coil form as the operation continues until a plurality of coils are wound. Being able to wind a plurality of coils in one continuous operation makes the present machine particularly suitable for winding a series of connected coils such as are used for the field coils of motors and the like. The traversing mechanism, including the controls therefor, is important to the present invention and consists of two components; one which guides the wire or other material onto an individual coil form, and another that shifts the first component from a position of guiding wire onto one coil form to a position of guiding wire onto another coil form.

The principal members in the present machine which are responsible for shifting the traversing mechanism from a position guiding wire on one form to a position of guiding wire on another form are an indexing drum 17 with cams 28 mounted thereon and a cam follower 29 which cooperates with the cams 28. The indexing drum 17 is mounted on a shaft 18, and the shaft 18 carries a gear 19 that meshes with a rack gear 20. The rack gear 20 is connected to a piston and rod assembly 21a of motor 21 and its movement is controlled by a solenoid valve 22 connected between the motor 21 and the conduit 2 by conduits 23 and 23a respectively. The solenoid valve 22 is provided with a delay device 66 (FIG. 3) which prevents its immediate actuation when energized, the reason for which will be described hereinafter.

A floating gear 24 is also carried on the shaft 18 to the left of the gear 19 and is meshed with the driving means for the machine (not shown). A shoulder 25 on the floating gear 24 engages a clutch member 26 attached on the shaft 18 when the latter is energized and rotates the shaft 18. The same driving means may be used to drive the indexing drum 17 that is used to drive the mandrel 8, but usually it is necessary to provide a speed reducer (not shown) therefor because the index drum 17 rotates at a slower speed than the mandrel 8.

The indexing drum 17 (FIGS. 1 and 4) has a plurality of spaced circumferential grooves 27 formed therein which slidably receive the cams 28. The cams 28 are movable along the grooves 27 for adjusting the machine, and are locked in position when the machine is operating. The grooves 27 are T-shaped in cross section (FIG. 2) and permit the cams 28 to be threadedly connected to cooperating slides 28a that are movable in the inner crossed portions of the grooves 27. When adjusting the positions of the cams 28, the slides 28a are loosened from the cams 28 by means of connecting bolts 28b, and when the cams 28 are properly located the bolts 28b are retightened. It is anticipated that where the machine is to be employed for routine jobs, a pre-cut cam form could be mounted on the index drum 17 thereby avoiding the necessity of having to adjust each of the cams 28 individually.

During operation of the coil winding machine, the cams 28 are slidably engaged (one at a time) by the cam follower member 29 which is attached to a guide rod 30 (FIG. 1). The left end of the guide rod 30 is connected to a piston and rod assembly 31a which is slidably positioned in a motor 31. The opposite ends of the motor 31 are connected to different outlets on a two-way solenoid valve 32 by conduits 33 and 34, and the inlet to the valve 32 is connected to the main input conduit 2 by conduit 35. The direction in which the piston and rod assembly 31a and the attached follower 29 moves depends upon which of the outlet conduits 33 or 34 on the valve 32 is open to the motor 31. The solenoid valve 32, being a two-way valve, is constantly in communication with one or the other end of the motor 31.

The right end of the guide rod 30 is connected by screws 36a, to a traversing guide 36. The guide 36 has a spooler member 37 pivotally mounted thereon by a pin 38, and the spooler 37 has a slot 37a that extends downwardly from its upper end through which the wire or other threaded material passes during the winding of the coil forms 13. The lower end of the spooler 37 is provided with a rounded bottom edge 37b that makes frictional engagement with a spooler bar 39. The spooler bar 39, as will be shown, is movable back and forth relative to the guide 36 and remains engaged with the spooler 37. During the back and forth movement of the bar 39, the spooler 37 rotates back and forth on the pin 38. Adjustable screws 80 with lock nuts 81 are provided on the guide 36 to limit the movement of the spooler 37 (FIG. 1).

The right end of the spooler bar 39 is slidably positioned in a passage 41 on a support bracket 41a, and the left end of the spooler bar 39 is attached to a piston and rod assembly 42a of a motor 42. The piston and rod assembly 42a is also connected at its other end to a piston and rod assembly 43a in a hydro check valve 43. The hydro check valve 43 is used to dampen the operation of the spooler bar 39 and will be described in greater detail later.

The motor 42 is controlled by two-way solenoid valve 44. Two outlet conduits 45 and 46 connect the opposite ends of the motor 42 with the outlet ports on the valve 44, and whichever of the conduits 45 or 46 is in communication with the motor determines the direction in which the piston and rod assembly 42a moves. The inlet port to valve 44 is connected by conduit 47 to conduit 2.

The valve 44, being two-way, moves between positions in which one or the other conduit 45 or 46 is communicating with the motor 42. Therefore, when the machine is operating, the piston and rod assembly 42a moves in one or the other direction all the time.

Electrical controls are associated with the valve 44 and they include a starting switch 58 (FIG. 3) and two limit switches 48 and 49. The limit switches 48 and 49 (FIG. 1) are of a self-restoring type and are alternately operated by cams 50a and 50b respectively located on a T-bar assembly 50. The alternating operation of the limit switches 48 and 49 transfers the solenoid operated valve 44 between a position in which the motor 42 alternately communicates with conduit 2 through conduits 45 and 46, depending on which switch 48 or 49 was last operated. The piston and rod assembly 42a and the spooler bar 39 move in the direction required by the limit switches 48 and 49 and reverses its direction of movement each time a limit switch is actuated. Therefore the spooler bar 39 and the T-bar assembly 50 move back and forth between the limits defined by the limit switches 48 and 49 and in so doing move the spooler 37 back and forth to guide wire in smooth layers onto the coil form 13 being wound.

The hydro check valve 43 is used to dampen the movement of the spooler bar 39 and is filled with fluid. The opposite ends of valve 43 communicate through a conduit 51, and the conduit 51 has a constriction 52 and a cooperating adjustable needle valve 53 therein which enables the dampening to be adjusted. During movement of the piston and rod assembly 43a and 42a, the fluid in the hydro check valve 43 passes through the conduit 51 and the constriction 52. Therefore, by adjusting the needle valve 53 in the constriction 52, the fluid flow through conduit 51 can be regulated as desired. A compensator valve assembly 54 is connected to the valve 43 by a conduit 55 and compensates for changes in the fluid caused by temperature and other atmospheric conditions.

*Electrical circuits*

In the particular embodiment of the invention shown (FIG. 1), the electrical circuits consists of a reset circuit identified by number 56 (FIG. 1), a starting circuit identified by number 57, and a stop circuit (not numbered). All three circuits will be described in detail in connection with FIG. 3.

FIG. 3 shows a typical circuit diagram for the coil winding machine. Starting switch 58 connects the machine to a source of electrical energy and has two transfer contacts 58a and 58b. When the starting switch 58 is actuated a circuit is established that energizes clutch solenoid coil 59 and causes the shoulder 25 on gear 24 (FIG. 1) to engage the clutch member 26 for rotating the index drum 17. This circuit is from the line, through the starting switch contact 58a, to and through the clutch solenoid coil 59, to and through the normally closed contact points 60b of reset switch 60, and back to the other side of the line through the contact 58b.

If the piston and rod assembly 42a is at either end of its travel a circuit will also be completed to energize the corresponding coil of the two-way solenoid valve 44. In FIG. 3, coil 61 of the solenoid valve 44 is shown energized because the spooler bar 39 and the T bar assembly 50 are in the leftward position. If the spooler bar 39 and T bar assembly 50 were in the rightward position, coil 62, instead of coil 61, would be energized. Between these limits, the solenoid valve 44 remains in a position corresponding to the coil 61 or 62 last energized.

A further circuit is available with the start switch 58 actuated to energize coil 63 of the two-way solenoid valve 32 which controls the movement and position of the cam follower 29. When the coil 63 is energized, the right end of the motor 31 communicates with the main conduit 2 and the piston and rod assembly 31a, the rod 30, and the cam follower 29 move leftwardly (FIG. 1).

The circuit for energizing the coil 63 is from the switch contact 58a to and through the coil 63, to 60a normally-closed contacts on the reset switch 60, and to the other side of the line at contact 58b.

During operation of the machine the cam follower 29 engages the right side of each cam 28 and moves from cam to cam as the drum 17 rotates. When a set of coils has been completed the cam follower 29 must be restored to a rightward position in readiness for winding another set of coils and the drum 17 must be rotated in the opposite direction to its starting position. To restore the machine as described the reset switch 60 is provided. When the reset switch 60 is actuated, the normally closed 60a and 60b contacts are opened and the normally open 60a, 60b and 60c contacts are closed. In this way a circuit is completed to energize coil 64 in the solenoid valve 32 which communicates the left end of the motor 31 with the main conduit 2 and causes the piston and rod assembly 31a, the cam follower 29, and the traversing guide 36 to move to the right. With the energizing of the coil 64, through the 60a normally-open contacts, the coil 63 is de-energized. It is clear, therefore, that only one of the coils 63 and 64 can be energized at a time.

Another circuit is completed by the actuation of the reset switch 60 to energize coil 65 in the solenoid valve 22 for restoring the index drum 17 to its starting position. A time delay mechanism 66, shown for illustrative purposes in series with the coil 65, prevents the coil 65 from being energized immediately on actuation of the reset switch 60 to allow sufficient time to elapse for the piston and rod assembly 31a to be restored before the drum 17 starts to restore. This enables the index drum 17 to be restored without the cam follower 29 binding on the bottom ends of the cams 28. The circuit for energizing the coil 65 is from the starting switch contact 58a, to and through the coil 65, to and through the time delay mechanism 66, to the normally-opened 60b contacts of the reset switch 60 (closed during reset), and to the other side of the line.

A normally-opened contact 60c on the reset switch 60 is also closed when the reset switch 60 is actuated, and this contact energizes a counter reset solenoid coil 67 which restores counting mechanism 68 which may be included to its starting or zero position. The counting mechanism 68 is usually responsive to the number of turns of wire wound in a particular operation, moving a certain amount and registering each turn until the windings are complete. Various types of counting devices can be employed on the present machine without changing its character. An ear 69 on the counting mechanism 68 coacts with a movable contact strap 70 on a stop switch 71 each time the counter mechanism 68 has totaled the predetermined number of turns to be wound. The coaction of the ear 69 with the strap 70 closes a circuit to a tripping relay 72 which stops the machine. Transfer contact points 72a and 72b on the tripping relay 72, when actuated, complete a circuit to a braking solenoid coil 73, which when energized, stops the machine. The tripping relay 72 may also be provided with a second coil 74 connected through a normally opened switch 75 across the line. By manually actuating the switch 75, the coil 74 is energized and the machine can be stopped at any time. The coils 73 and 74 are usually mounted on a common core which when energized trips the main switch 58 causing the movable contacts 58a and 58b to break the circuit to the line.

*Operation*

To understand the operation of the coil winding machine, it has been thought convenient to select as a starting point the condition of the machine just after a series of coil forms 13 have been wound and the machine has stopped.

To remove the wound coil forms 13, the operator actuates the valve 1 which communicates motor 3 with the main conduit 2 through conduit 5. This moves the piston and rod assembly 6 to the left thereby sliding the wedge 11 into loose engagement with the groove 10. The loosening of the wedge 11 frees the wound coil forms 13 from the mandrel 8 enabling them to be removed and replaced with empty coil forms 13. When the operator has placed empty forms 13 on the mandrel 8, he applies thumb pressure axially on the left end of the wedge 11 and again depresses the foot valve 1 to exhaust the motor 3 through the exhaust conduit 4. This allows the wedge 11 to slide to the right and to hold the empty coil forms 13 in proper position securely on the mandrel 8. It is anticipated that the pressure in the main conduit 2 could also be used to move the wedge 11 to the right or to move the wedge 11 in both directions for engaging and for loosening the coil forms 13.

Next, the operator actuates the start switch 58 and the reset switch 60. It is necessary to have the start switch 58 actuated in order to reset the machine because the power for resetting the machine comes through the start switch 58. Therefore, it is necessary when resetting the machine to depress the reset and the start switches together. The reset circuit 56 (FIG. 1) is connected to the coil 64 of the solenoid valve 32 which when energized communicates the left end of the motor 31 with the conduit 2 through the conduit 35 and the conduit 33. This moves the piston and rod assembly 31a rightwardly to the restored position. The piston and rod assembly 31a is connected to the guide bar 30 that carries the cam follower 29 and the winding guide 36, and these members also move to their rightward restored positions.

The solenoid valve 22 is also in the reset circuit 56, and when energized communicates the motor 21 with the conduit 2 through conduits 23a and 23. The coil 65 of the solenoid valve 22 is connected in a circuit with the delay mechanism 66 which delays its operation until the cam follower 29 has had time to move rightwardly to its restored position.

When the solenoid 22 is finally energized, the air entering the motor 21 moves the piston and rod assembly 21a downwardly, and the piston and rod assembly 21a, which is connected to the rack gear 20, rotates the gear 19 thereby restoring the index drum 17 to a position where the cam follower 29 is adjacent to the right most cam 28. This completes the reset operation.

With the machine reset, the stop switch 71 on the counting mechanism 68 is open; and as soon as the operator releases the reset switch 60 (with the start switch 58 energized), the machine commences to wind the empty coil forms 13. The solenoid valve 44 and the clutch solenoid coil 59 are energized (as described heretofore) when the reset switch 60 is released, and the coil 63 of the solenoid operated valve 32 is also energized. The index drum 17 commences to rotate as soon as the clutch 26 engages the shoulder 25, which engagement is caused, as explained, by the energizing of the clutch coil 59.

The energization of the coil 63 in the solenoid valve 32, caused by release of the reset switch 60, communicates the right end of motor 31 with the conduit 2 through the conduits 35 and 34 and moves the piston and rod assembly 31a leftwardly maintaining a constant pressure by the cam follower 29 against the right sides of the cams 28. As the index drum 17 rotates, the pressure in motor 31 causes the cam follower 29 to jump from one cam 28 to the next, and since the cam follower 29 is also connected by rod 30 to the traversing guide 36, each leftward jump of the cam follower 29, also moves the traversing guide 36 leftwardly causing it to move to succeeding positions adjacent to each of the coil forms 13.

The two-way solenoid valve 44, as previously described, is controlled by the two limit switches 48 and 49 which are alternately actuated at regular time intervals during the operation of the machine. The alternating motion of the piston and rod 42a produced by the switches 48 and 49 is transmitted to the spooler 37 through the frictional engagement between the rounded lower end of the spooler 37 and the back and forth motion of the bar 39. Therefore, during the interval while the cam follower 29 is sliding along one of the cams 28, the spooler 37, because of the reciprocating action just described, moves back and forth across an individual coil form 13. The adjustable screws 80 on the traversing guide 36 can be set to limit the amount of back and forth travel of the spooler 37 and to insure against any excessive travel of the spooler bar 39 causing the wire to accidentally be fed on the wrong coil form. Usually the screws 80 are adjusted to engage the spooler member 37 at both ends of its travel thereby insuring that the spooler 37 always completes each stroke. When the index drum 17 has rotated to a position where the follower 29 jumps to another cam 28, the spooler guide 36, which is also attached to the guide rod 30 jumps to a fresh coil form and commences winding it. It should be noted that the number of turns wound on any one coil form 13 depends on the time interval during which the follower 29 is engaged on the corresponding cam 28 for that coil form and also on the speed at which the mandrel 8 is rotated. At a constant speed, therefore, a short period of engagement between the follower 29 and cam 28 will wind relatively fewer turns on a coil than for a longer engagement. It is also anticipated to vary the width and number of coils to be wound in any one operation by varying the axial dimension of the cams 28.

The check valve 43 is included to dampen the alternative action of the spooler bar 39. The amount of dampening obtained depends upon the adjustment of the needle valve 53 in the constriction 52. The more seated in the constriction 52 the needle valve 53 is, the smaller is the area of fluid passage thereby and the greater is the dampening effect.

When the follower 29 has completed its final leftward movement (as indicated by the counting mechanism 68), the machine automatically stops so that the wound coil forms 13 may be removed and replaced with other empty forms. The automatic stopping may be accomplished in many different ways as by any suitable counter and switching arrangement that counts the number of turns for a set of coil forms and then operates the stop switch 71. The stopping circuit is also provided with the manual switch 75 for stopping the machine by hand at any time.

Thus, it is apparent that there has been provided a novel automatic coil winding machine, which fulfills all of the objects and advantages sought therefor.

The foregoing description and the accompanying drawings have been presented only by way of illustration and example, and changes and alterations in the present disclosure, which will be readily apparent to those skilled in the art, are contemplated as within the scope of the present invennion which is limited only by the claims which follow.

What I claim is:

1. In a coil winding machine, a traversing mechanism for guiding wire successively onto a plurality of rotating coil forms positioned in axial alignment comprising a wire guide positioned adjacent to the coil forms and registrable therewith for guiding wire thereon, cooperating relatively movable cam and cam follower members one member of which is operatively connected to the wire guide, and first and second valve controlled motor means each having relatively movable members at least one member of each being operatively connected to the wire guide, the connected member of said first valve controlled motor means moving said wire guide back and forth relative to the coil form being wound for guiding wire in smooth layers onto said coil form, and said connected member of the second valve controlled motor means moving said wire guide in response to predetermined relative movement of the cam and cam follower members from positions in which the wire guide is registered for winding the final turn on each of the coil forms to positions in which the wire guide is registered for winding the initial turn on each succeeding coil form.

2. In a coil winding machine, a traversing mechanism for guiding wire individually and continuously onto a plurality of rotatable coil forms positioned in axial alignment comprising a wire guide positioned adjacent to the coil forms, first and second valve controlled motor means each including relatively movable members, one member of each being operatively connected to the wire guide, said first valve controlled motor means periodically reversing the direction of movement of the wire guide so that wire is guided in smooth layers on the coil forms, and said second valve controlled motor means including means for moving the wire guide from positions registering the final turn on each of the coil forms to positions registering the initial turn on each succeeding coil form.

3. A coil winding machine for winding threaded material onto a plurality of coil forms in a continuous operation comprising a frame, means on said frame for rotatably positioning a plurality of longitudinally spaced coil forms, means for rotating said coil forms, movable guide means positioned adjacent to and registering with said coil forms for guiding threaded material onto said coil forms during rotation thereof, said guide means including a pivoted guide member and a reciprocating member frictionally engaged therewith for continuously pivoting said guide member during winding of the coil forms, means connected to the guide member for shifting the position of frictional engagement thereof on the reciprocating member whereby said guide means moves from a position guiding threaded material onto one of said coil forms to a position guiding the material onto another of said coil forms, said last named means including a stepped indexing member having a surface thereon corresponding to each of the coil forms being wound and a follower member engaged with the indexing member and adapted to cooperate with each of said surfaces during winding of the corresponding coil forms, and reset means including means for restoring the guide member to a predetermined starting position, and other means for restoring the stepped indexing member to a predetermined starting position after the guide member is restored.

4. In a coil winding machine, a traversing mechanism for guiding wire successively onto each of a plurality of rotatably mounted coil forms positioned in axial alignment comprising guide means for guiding wire onto the coil forms during rotation thereof, said guide means including a pivotal guide member having means on one end for directing wire onto the coil form being wound, first valve controlled motor means having a reciprocating piston member frictionally connected to the guide means for moving the wire directing means back and forth to guide wire onto the coil forms in smooth layers during the winding thereof, and actuator means including an indexing member having a surface thereon associated with each of the coil forms to be wound, and a follower member adapted to move on said surfaces during winding of the corresponding coil forms, said follower member having a connection to the guide member for shifting the position thereof in opposition to the frictional connection with the piston member and in response to movement of the follower member from a position engaging one of said surfaces to a position engaging another of said surfaces for moving the guide member from a position registering the final turn on one coil form to a position registering the initial turn on another coil form.

5. A machine for winding a plurality of coils in a continuous operation comprising a frame, means on the frame for rotatably mounting a plurality of spaced coil forms, means for rotating the coil forms, means mounted adjacent to the coil forms for guiding threaded material onto the coil forms during rotation thereof, said last named means including a pivoted guide member and a reciprocating member frictionally engaged therewith for moving said guide member back and forth relative to the coil forms, and indexing means for shifting the position of the guide member along the reciprocating member whereby the guide member is moved from a position guiding threaded material onto one coil form to a position guiding threaded material onto another coil form, said indexing means including a stepped cam member having a cam surface thereon corresponding to each coil form being wound and a follower member engageable with each of said surfaces during winding of the corresponding coil forms, said follower member being connected to the guide member.

6. A coil winding machine comprising a frame, means rotatably mounting a plurality of coil forms of said frame, guide means for guiding wire onto the coil forms during rotation thereof, said guide means including a wire guide member adapted to be positioned to register with each of said coil forms during the winding thereof, a reversible fluid motor having a reciprocating piston member frictionally engaged with said wire guide member for moving said wire guide member back and forth across a coil form being wound, and index means for sliding said wire guide member longitudinally on said piston member from a position thereon registering the final turn on each coil form to a position registering the initial turn on each succeeding coil form, said index means including cam means having a cam surface thereon associated with each of said coil forms being wound, follower means slidingly engageable with said surfaces during winding of the corresponding coil forms and connected to the wire guide member, and motor means for maintaining said follower means engaged with said surfaces during operation of the machine, said cam surface associated with each coil form being adjustable in length to vary the time during which the follower member is engaged therewith.

7. A coil winding machine comprising a frame, means rotatably mounting a plurality of coil forms on said frame, guide means for guiding wire onto the coil forms during rotation thereof, said guide means including a wire guide member adapted to be positioned to register with each of said coil forms during the winding thereof, a reversible fluid motor having a reciprocating piston member frictionally engaged with said wire guide member for moving said wire guide member back and forth across a coil form being wound, means associated with said guide means for adjusting and limiting the range of back and forth movement of the wire guide member, and index means for sliding said wire guide member longitudinally on said piston member from a position thereon registering the final turn on each coil form to a position registering the initial turn on each succeeding coil form, said index means including cam means having a cam surface thereon associated with each of said coil forms being wound, follower means slidingly engageable with said surfaces during winding of the corresponding coil forms and connected to the wire guide member, and motor means for maintaining said follower means engaged with said surfaces during operation of the machine.

References Cited in the file of this patent
UNITED STATES PATENTS

| | | |
|---|---|---|
| 805,265 | Cowles et al. | Nov. 12, 1905 |
| 1,507,404 | Welch | Sept. 2, 1924 |
| 1,807,199 | Dear | May 26, 1931 |
| 2,461,855 | Tornberg | Feb. 15, 1949 |
| 2,597,375 | Rinehart | May 20, 1952 |
| 2,698,033 | Ammann et al. | Dec. 28, 1954 |
| 2,770,424 | Grove | Nov. 13, 1956 |
| 2,736,346 | Ammann | Feb. 28, 1956 |

FOREIGN PATENTS

| | | |
|---|---|---|
| 525,485 | Canada | May 29, 1956 |